March 22, 1949.  W. G. BRAINERD  2,465,145
DEMOUNTABLE CONVEYER TROUGH
Filed April 4, 1947  2 Sheets-Sheet 1
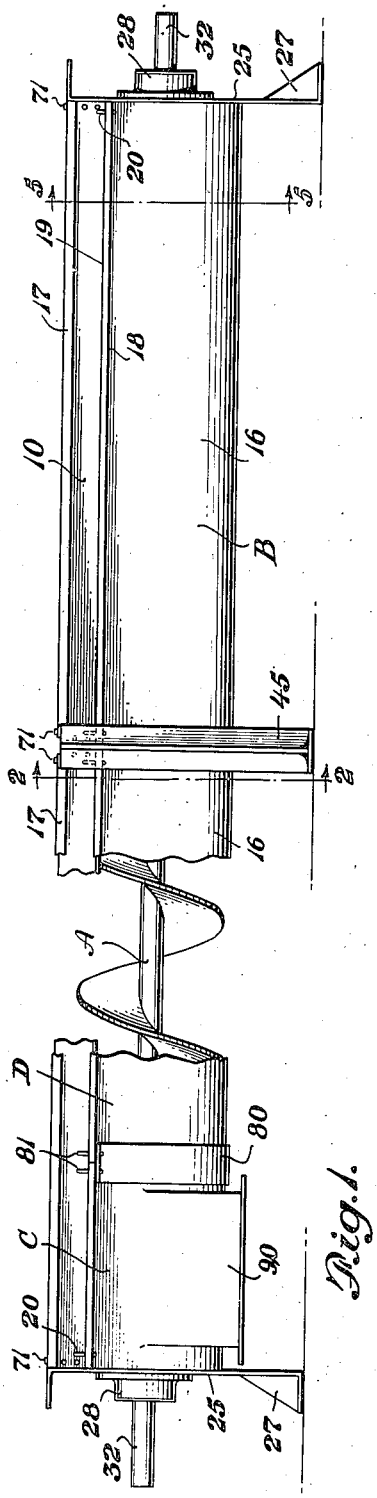
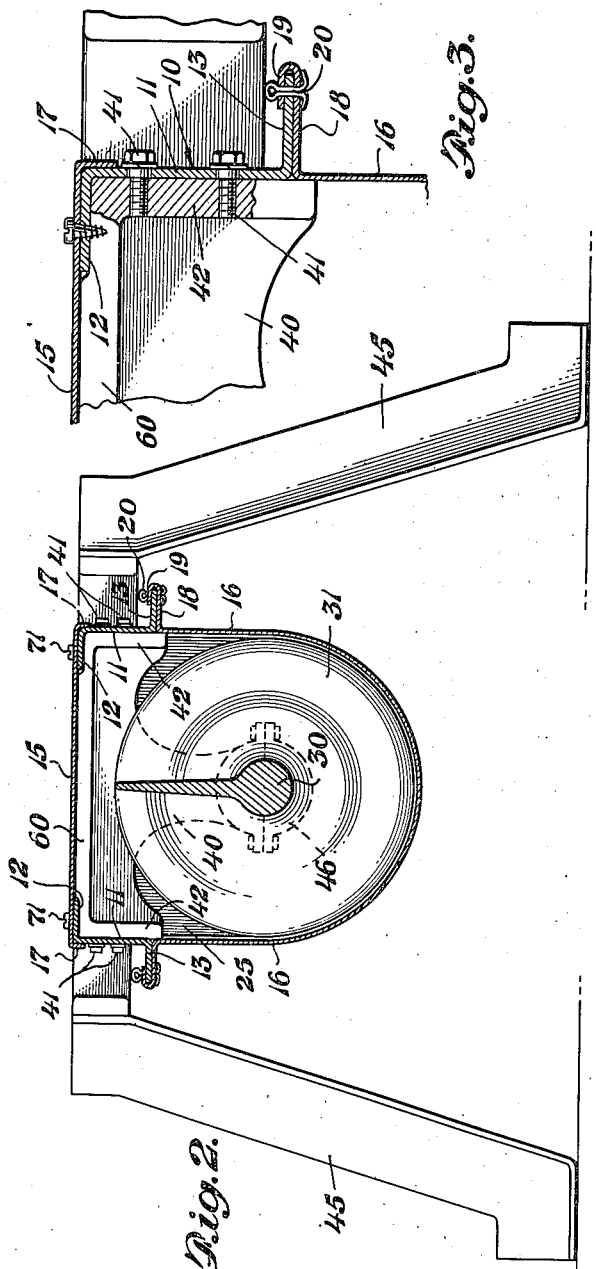
Inventor
W. G. Brainerd
By Minson H. Hare
Attorney March 22, 1949.  W. G. BRAINERD  2,465,145
DEMOUNTABLE CONVEYER TROUGH
Filed April 4, 1947  2 Sheets-Sheet 2
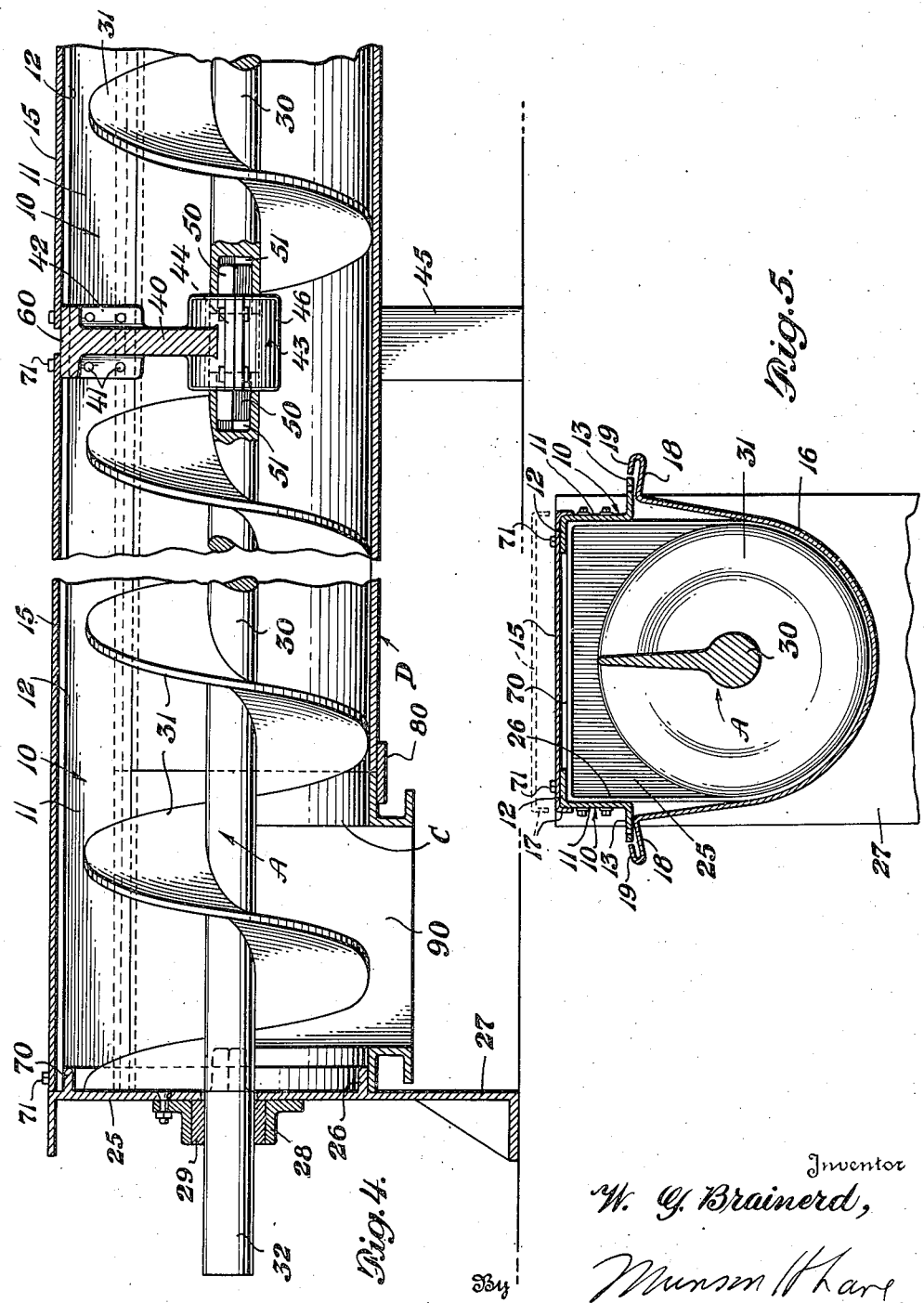
Inventor
W. G. Brainerd,
By Munson W Hare
Attorney Patented Mar. 22, 1949

2,465,145

UNITED STATES PATENT OFFICE 2,465,145

DEMOUNTABLE CONVEYER TROUGH

Wilbur G. Brainerd, Wichita, Kans.

Application April 4, 1947, Serial No. 739,387

6 Claims. (Cl. 198—213)

1

This invention relates to screw conveyors for the transfer of grain, mill products or any other suitable material.

In the wheat and corn milling industry screw conveyor boxes and the contained screws are one of the main harbors for vermin. These screw conveyor boxes and troughs are of such construction that only by long periods of shutdowns may they be demounted and cleaned. Their interiors are dead spaces which are quite difficult to effectively fumigate. All industries handling food products have this problem of sanitation.

It is an object of this invention to provide a conveyor trough, the bottom of which may be quickly removed without tools for the purpose of cleaning both the trough itself and the contained conveyor screw.

A further object is to provide a conveyor box, the bottom of which may be quickly removed for the replacement of worn parts and making repairs.

The invention will be more readily understood by reference to the accompanying drawings, in which is disclosed an illustrative embodiment of the invention, and the following detailed description.

In the drawings:

Fig. 1 is a side elevational view of the instant invention, partly broken away for clarity;

Fig. 2 is a transverse sectional view on the line 2—2 of Fig. 1;

Fig. 3 is an enlarged detail sectional view of a portion of Fig. 2;

Fig. 4 is an enlarged longitudinal sectional view illustrating more clearly the conveyor shaft suspension and lapped joint between the sections of the trough; and Fig. 5 is an enlarged transverse sectional view taken on the line 5—5 of Fig. 1, showing the trough about to be dropped.

Referring to the drawings, the conveyor comprises a sectional screw conveyor member A and a trough B housing the screw conveyor and suitably supported at its ends and at intermediate points.

As shown, the trough B comprises a pair of spaced longitudinally extending Z irons 10 supported at suitable intervals and each comprising a vertical portion 11 to which the intermediate shaft hangers and their supports are secured. The Z irons also include inturned horizontal flanges 12 adapted to jointly support the removable top portion 15 of the hopper, these inturned flanges being likewise secured to the

2 tops of the shaft hangers, as will be more fully described hereinafter. In addition the Z irons include outturned flanges 13 which serve to support the removable bottom 16 of the trough B.

The top member 15 may be formed of flat sheet metal with downwardly extending flanges 17, 17, which are adapted to fit over the upright portions 11 of the Z irons 10.

The bottom member 16 is preferably formed of flexible sheet metal and is rounded in form with an open top. The member 16 is provided with outturned flanges 18 snugly fitting the under side of the outturned flanges 13 of the Z irons 10, which flanges 18 are then inturned to provide flange members 19 fitting the tops of the flanges 13. In this way a snug joint is provided and the bottom member 16 may be retained without further fastening device. However, for added safety, easily removable cotter pins 20 may be provided extending through the flanges 18 and 19 of the bottom member 16 and through the flange 13 of the Z iron.

The trough B is closed at its ends by end plates 25 which, as shown, are inwardly flanged at 26 to fit into the interior of the trough. The end plates 25 are provided with suitable supporting legs 27 which are adapted to rest on any suitable base.

To each of the end plates 25 there is secured a tubular housing member 28, which encloses a bearing 29 for the movable ends of the shaft of the conveyor A.

As shown, the conveyor A is of the usual helical type and includes a central shaft 30 and a helical screw member 31. The shaft may be formed of any number of sections, which are nonrotatably secured together, and the projecting ends 32 are preferably made removable from the remainder of the shaft, which may also be supportable at intermediate parts, preferably where the trough and shaft are supported by hangers 40 secured to the Z irons 10 by bolts 41 or other suitable fastening means extending through vertical flanges 42 on the hanger and through the upright portions 11 of the Z irons. Any desired number of hangers may be provided, only one being illustrated in the fragmentary portion of the conveyor represented herein. Each hanger 40 is provided with a two-part bearing 43, in which is mounted a stub shaft portion 44 having squared ends 50 to fit complementary squared hollowed ends 51 of adjacent sections of the shaft 30. Similar connections may be provided at the ends of the shaft. The hanger members 40 are provided with supporting legs 45 corresponding to the legs 27 of the end plates 25. Any desired number of intermediate hangers may be provided as may be required to suitably support the trough, conveyor screw and load. The lower portion 46 of each bearing member 43 of the hanger 40 may be removable to afford access to the stub shaft portions 44 of the screw conveyor.

The top plates 15 of the trough B may be made in sections, the ends of which are secured to the upper flanges 12 of the Z members 10, and to top flanges 60 of the hangers 40, or to top portions 70 of the inturned flanges 26 of the end plates 25. Any suitable fastening means may be employed, as, for example, metal screws 71. By removing one of these top sections access may be had to the interior of the conveyor for inspection or cleaning purposes, to provide an intake for material to be supplied to the conveyor, or if desired, one of the top plates may be provided with a feed or intake opening.

The removable bottom member 16 of the trough may also be made in any suitable number of lengths. Where the lengths come together they may be joined by a butt strap 80 which underlies the two adjacent ends of sections C and D of the bottom member 16, the ends of the strap being secured to the outwardly projecting flanges 13 of the Z members by means of suitable fastening means, such as bolts 81. As shown, section C of the bottom member 16 is provided with an outlet opening 90 which constitutes the discharge outlet for the conveyor.

In operation, any suitable material may be supplied to the conveyor at one end thereof and is conveyed to a discharge outlet 90 by rotation of the conveyor screw A. When it is desired to clean the conveyor the trough shaped bottom portion 16 may be readily removed in order to clear the screw A and remove any accumulated matter, without disturbing either the end or intermediate shaft hangers 25 or 40, which are entirely independent of the lower portion of the trough. Similarly, the top 15 of the trough is readily removable to permit inspection, or for other purposes.

While the combined longitudinal members 10, top 15 and removable bottom 16 have been referred to herein as constituting the trough of the conveyor, the removable member 16 may itself be considered as constituting the trough and the members 10 may be considered as constituting portions of a fixed frame which may be covered by the top member 15. An important feature of the invention consists in the convenient manner in which the member 16 may be removed from the remaining portions of the conveyor without disturbing the frame, the hangers or the conveyor screw. While the cotter pins 20 are shown as a supplemental attaching means for the flanges of the bottom member 16, it will be understood that these cotter pins may be omitted and the trough may be supported solely by the inturned flanges 19 thereof. The flexibility of the bottom member 16 is such that the flanges 19 may be readily supported from the outturned flanges 13 of the Z irons, as clearly indicated in Fig. 5. When the bottom member 16 is replaced the resilience of the trough will cause the flanges 19 to snugly engage the outturned flanges 13 and hold the bottom of the trough in position upon the fixed frame portions of the trough.

The invention has been described in detail for the purpose of illustration, but it will be obvious that numerous modifications and variations may be resorted to without departing from the spirit of the invention.

I claim:

1. Screw conveyor apparatus comprising a pair of continuous spaced longitudinally extending frame members, hangers carried by said frame members, and a screw conveyor jointly supported for rotation by said hangers, said frame members having outwardly extending longitudinal flanges, and a detachable trough member housing said conveyor and composed of resilient sheet metal having inturned flanges adapted to releasably grip the outturned flanges of the frame members and retain the trough in position by the resilience of the sheet metal of which the trough is composed.

2. Screw conveyor apparatus comprising a pair of continuous spaced longitudinally extending frame members, hangers carried by said frame members, and a screw conveyor jointly supported for rotation by said hangers, said frame members having outwardly extending longitudinal flanges, a detachable trough member housing said conveyor and composed of resilient sheet metal having inturned flanges adapted to releasably grip the outturned flanges of the frame members and retain the trough in position by the resilience of the sheet metal of which the trough is composed, and a removable top member secured to said frame members.

3. Screw conveyor apparatus comprising a pair of continuous spaced longitudinally extending frame members, hangers carried by said frame members, and a screw conveyor jointly supported for rotation by said hangers, said frame members having outwardly extending longitudinal flanges, and a detachable trough member having inturned flanges adapted to releasably grip the outturned flanges of the frame members and retain the trough in position by the resilience of the sheet metal of which the trough is composed, said frame members comprising Z irons having inturned upper flanges jointly supporting a removable top member.

4. Screw conveyor apparatus comprising a pair of continuous spaced longitudinally extending frame members, hangers carried by said frame members, and a screw conveyor jointly supported for rotation by said hangers, said frame members having outwardly extending longitudinal flanges, and a detachable trough member having inturned flanges adapted to releasably grip the outturned flanges of the frame members and retain the trough in position by the resilience of the sheet metal of which the trough is composed, said frame members comprising Z irons having inturned upper flanges jointly supporting a removable top member, and said top member having downturned flanges fitting over said frame members.

5. Screw conveyor apparatus comprising a pair of continuous spaced longitudinally extending frame members, hangers carried by said frame members, and a screw conveyor jointly supported for rotation by said hangers, said frame members having outwardly extending longitudinal flanges, and a detachable trough member housing said conveyor and composed of resilient sheet metal having inturned flanges adapted to releasably grip the outturned flanges of the frame members and retain the trough in position by the resilience of the sheet metal of which the trough is composed, said trough member including a pair of longitudinal sections, a butt strap overlapping the adjacent ends of said sections, and having outturned flanges secured to the outturned flanges of said frame members.

6. Screw conveyor apparatus comprising a pair of continuous spaced longitudinally extending frame members, hangers carried by said frame members, and a screw conveyor jointly supported for rotation by said hangers, said frame members having outwardly extending longitudinal flanges, and a detachable trough member housing said conveyor and composed of resilient sheet metal having inturned flanges adapted to releasably grip the outturned flanges of the frame members and retain the trough in position by the resilience of the sheet metal of which the trough is composed, said trough member including a pair of longitudinal sections, a butt strap overlapping the adjacent ends of said sections, and having outturned flanges secured to the outturned flanges of said frame members, one of said longitudinal sections comprising an outlet for the conveyor.

WILBUR G. BRAINERD.

No references cited.